United States Patent

[11] 3,594,754

| [72] | Inventor | Roy E. Voshall |
| | | Pittsburgh, Pa. |
| [21] | Appl. No | 701,007 |
| [22] | Filed | Jan. 26, 1968 |
| [45] | Patented | July 20, 1971 |
| [73] | Assignee | Westinghouse Electric Corporation |
| | | Pittsburgh, Pa. |

[54] PRESSURE MEASUREMENT ARRANGEMENTS FOR A VACUUM-TYPE CIRCUIT INTERRUPTER
8 Claims, 6 Drawing Figs.

[52] U.S. Cl.................................................. 340/236, 340/248, 340/380
[51] Int. Cl...................................................G08b 21/00
[50] Field of Search........................................ 340/189, 248, 250, 251, 252, 253, 254, 256; 324/33, 96, 51, 52; 307/118; 200/144

[56] References Cited
UNITED STATES PATENTS

| 2,516,010 | 7/1950 | Marbury | 340/253 |
| 3,263,162 | 7/1966 | Lucer et al | 324/33 |
| 3,312,895 | 4/1967 | Garbuny | 340/189 |
| 3,335,367 | 8/1967 | Skooglund et al | 324/96 |
| 3,403,297 | 9/1968 | Grouch | 307/118 |
| 3,404,247 | 10/1968 | Glassanos | 200/144.2 |
| 3,495,165 | 2/1970 | Cobine et al | 324/33 |

Primary Examiner—John W. Caldwell
Assistant Examiner—Daniel Myer
Attorneys—A. T. Stratton, C. L. McHale and W. R. Crout ABSTRACT: The pressure within a vacuum-type circuit interrupter is measured by imposing a voltage of commercial power frequency between the floating condensing shield and one of the electrodes to determine the magnitude of current flow between these elements in a measuring circuit. A neon bulb may be used in parallel with a resistance in this measuring circuit to continuously indicate the state or condition of vacuum within the interrupter envelope. A glass-fiber rod may conduct the light from the neon bulb, which is at high potential, in its illuminated state, down to the side of a grounded housing. In another arrangement, one side of the neon bulb may be at ground potential, and consequently an insulating glass-fiber rod for light conduction is unnecessary.

PATENTED JUL 20 1971
3,594,754
SHEET 1 OF 2
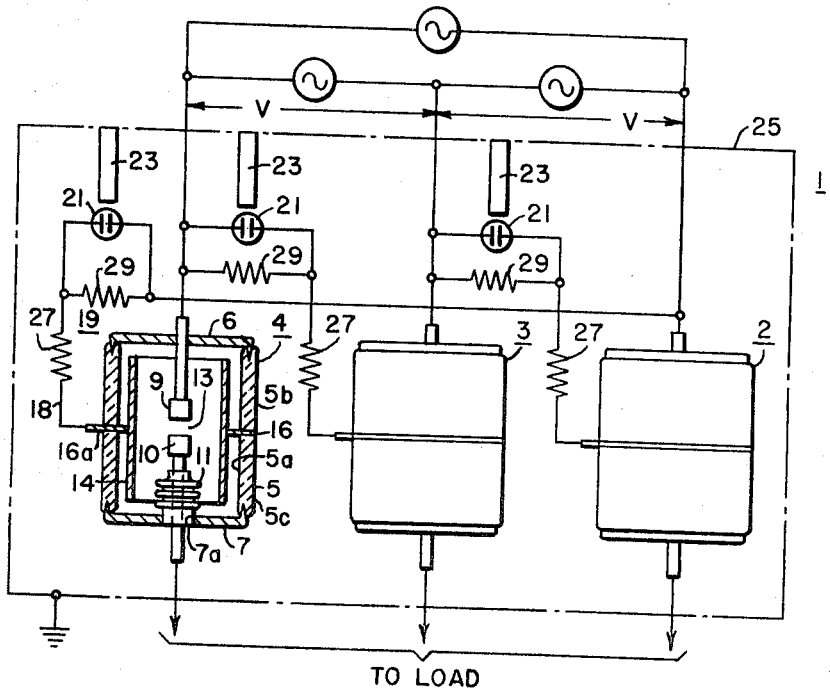
FIG. 1.
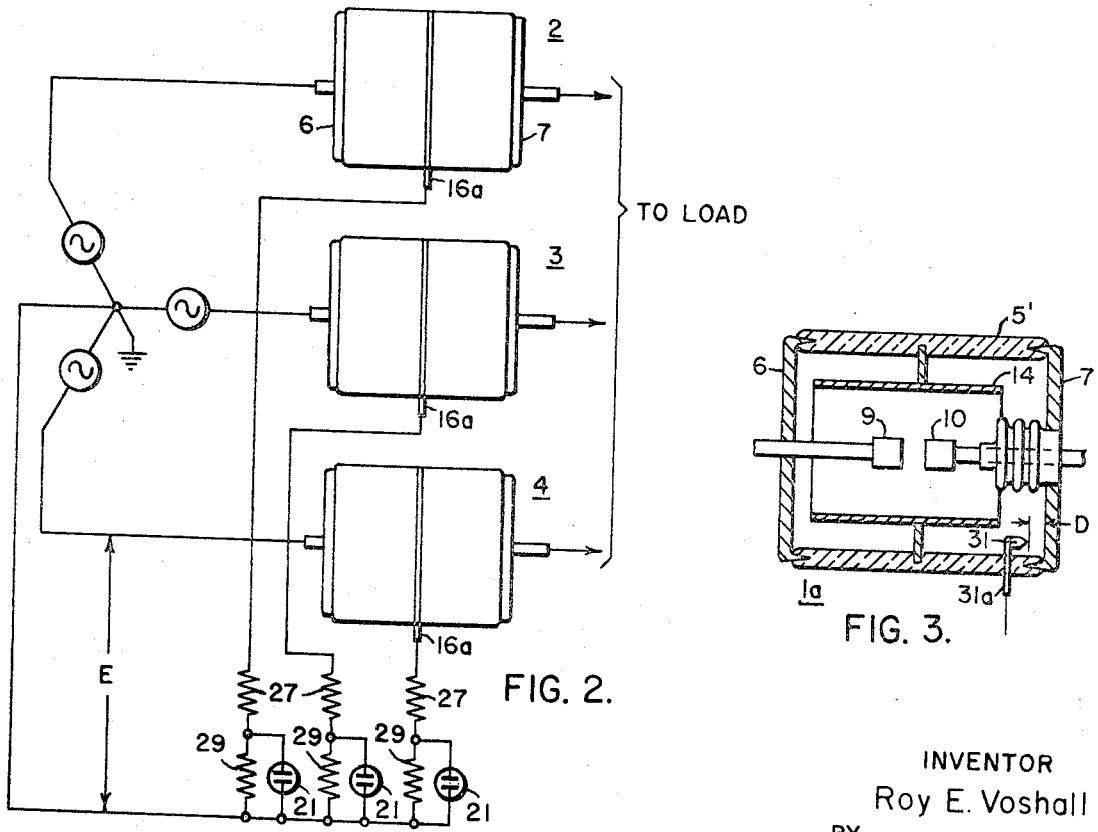
FIG. 2.
FIG. 3.
INVENTOR
Roy E. Voshall
BY
Willard R. Crout
ATTORNEY

PATENTED JUL 20 1971

PRESSURE MEASUREMENT ARRANGEMENTS FOR A VACUUM-TYPE CIRCUIT INTERRUPTER

In still another arrangement, the neon lamp may be in the low voltage side of a step-up transformer supplying high voltage of commercial power frequency between the vapor condensing element and one of the vacuum interrupter electrodes.

In another arrangement, a separate electrode is inserted into the envelope of the vacuum circuit interrupter. This is used for the pressure indicating electrode instead of the floating condensing shield. As a result, continuous monitoring of the pressure conditions within the vacuum circuit interrupter is possible to determine whether it is capable of interrupting its rated current and voltage.

In still another arrangement, a single step-up transformer has three high-voltage secondary windings to provide the three high voltages for the three vacuum-type circuit interrupters of a three-phase tap-changing circuit. An increase of pressure in any interrupter will increase the secondary current, which is sensed by a series relay in the primary circuit. This latter relay is energized to actuate an alarm circuit.

CROSS-REFERENCES TO RELATED APPLICATIONS

Applicant is not aware of any related applications pertinent to the present invention.

BACKGROUND OF THE INVENTION

The present invention relates to an arrangement for measuring the degree of vacuum present within a vacuum circuit interrupter and, more particularly, within a vacuum circuit interrupter, which is designed to operate with pressures in the neighborhood of $10^{14}$ mm. of mercury, or lower. According to past practice, an arrangement for measuring the degree of vacuum present in a vacuum interrupter involved determining the amount of voltage required to establish a spark breakdown between the separated electrodes of the interrupter. This scheme is not sufficiently accurate for measurement in the vacuum range, which the present interrupter is intended to operate. For example, breakdown voltage is essentially independent of pressure for pressures below $10^{13}$ mm. of mercury for arcing gaps having a length, such as contemplated for the present interrupters, say for example a length of one-sixteenth inch or greater.

In U.S. Pat. No. 2,864,998 issued Dec. 16, 1958 to Thomas H. Lee, there is described an arrangement in which there is connected to the interrupter, between its two spaced-apart main electrodes, a source of direct-current voltage, which is effective to produce an electron current between the two electrodes. The electrons emitted from the negatively charged main electrode collide with gas molecules inside the interrupter, and this produces positive ions at a rate dependent upon the pressure within the interrupter. The shield of the interrupter is maintained at a negative potential with respect to the negatively charged main electrode, and, as a result, acts as a collector for the positive ions formed within the interrupter. An external circuit interconnects the shield and the negatively charged electrode, and positive ion current flows in this circuit at a rate dependent upon the rate at which the shield collects positive ions. Thus, by measuring this positive ion current, an indication of the pressure within the interrupter is obtained.

A disadvantage of the scheme set forth in the aforesaid Lee U.S. Pat. No. 2,864,998 is that continuous monitoring of the pressure within the interrupter envelope is not possible, and the interrupter must be disconnected from the main circuit.

SUMMARY OF THE INVENTION

One of the objects of the present invention is to provide a simple, accurate and inexpensive arrangement for measuring the degree of vacuum present in a vacuum circuit interrupter, and, therefore, its interrupting capability. It is well known by those skilled in the art that a method is needed to indicate whether the vacuum in a vacuum interrupter is sufficiently good so that it can successfully interrupt a fault current of its rated current and voltage value. Experiments show that when the pressure in the interrupter is greater than $10^{14}$ torr, the vacuum interrupter may not interrupt a fault current at its rated current and current. As a result, an indicator (i.e. visual or audible) is needed to show whether the pressure has risen above $10^{14}$ torr. The characteristics of the electrical breakdown voltage versus pressure can be used as a sensor for the pressure indicator. Additional parts, or existing parts can be used for the sensors, as set forth in the present invention.

Another object of the present invention is to provide for a vacuum interrupter, a vacuum-measuring arrangement, which requires no, or a minimum of, additional elements within the interrupter beyond those present in the interrupter without the vacuum-measuring arrangement.

Still a further object of the present invention is to provide a vacuum-measuring arrangement, which requires no additional seals, or at least a minimum number of additional seals, beyond those present in the interrupter without the vacuum-measuring arrangement.

A very important object of the present invention is to provide a pressure-measuring arrangement for determining the integrity of a vacuum-type circuit interrupter or its interrupting capability, in a continuous manner, even while the vacuum interrupter contacts are closed and controlling the connected circuit.

An additional object of the present invention is to provide an improved pressure-measuring arrangement in which visual indication is readily apparent externally of the housing enclosing the apparatus, in the form of a light, or an alarm, so that operating personnel may readily determine whether the equipment is in a good operating condition and able to disconnect the circuit.

According to a preferred embodiment of the present invention, there is provided measuring circuit means for imposing a voltage of commercial power frequency between the floating condensing shield of a vacuum-type circuit interrupter and one of the separable electrodes. The current passing through this circuit measuring means is used to light a neon bulb, or actuate a relay, should the current become excessive in magnitude, and thereby indicate a poor vacuum condition within the envelope. As is obvious, a poor vacuum condition will not permit the vacuum interrupter to interrupt its rated current and voltage.

In still a further form of the present invention, a fiber optical tube is utilized to transmit visible light from the neon bulbs to the sidewall of the grounded enclosing housing, where the neon bulbs are at relatively high voltage, and it would be undesirable to have them come in close contact with operating personnel.

In still another arrangement, instead of using the floating condensing shield, one may insert an auxiliary electrode into the vacuum envelope, and cause it to take the place of the floating shield element, as in the aforesaid described arrangement.

In another arrangement a step-up transformer, with three high-voltage secondary windings, is used to measure the state of vacuum in three vacuum interrupters.

Further objects and advantages will readily become apparent upon reading the following specification, taken in conjunction with the drawings.

BRIEF DESCRIPTION OF THE DRAWINGS

FIG. 1 is a diagrammatic view of a three-phase vacuum-type circuit interrupter with a pressure-measuring arrangement in which glass-fiber optics are utilized to transmit visible light, generated within neon bulbs, to the outer grounded metallic housing for the equipment, the interrupter contacts being illustrated in the open-circuit position;

FIG. 2 is a diagrammatic arrangement of a three-phase circuit interrupter, similar to that illustrated in FIG. 1, but maintaining one side of the neon bulbs at ground potential, so that insulating fiber optics are not required, again the interrupter electrodes being illustrated in the open-circuit position;

FIG. 3 is a diagrammatic view of an alternate interrupter arrangement in which an additional auxiliary electrode is inserted into the vacuum envelope, and takes the place of the floating shield for pressure measurement, the external measuring circuitry being the same as in the arrangements of FIGS. 1 and 2, again the separable contacts being illustrated in the open-circuit position;

DESCRIPTION OF THE PREFERRED EMBODIMENTS

Figure 5:
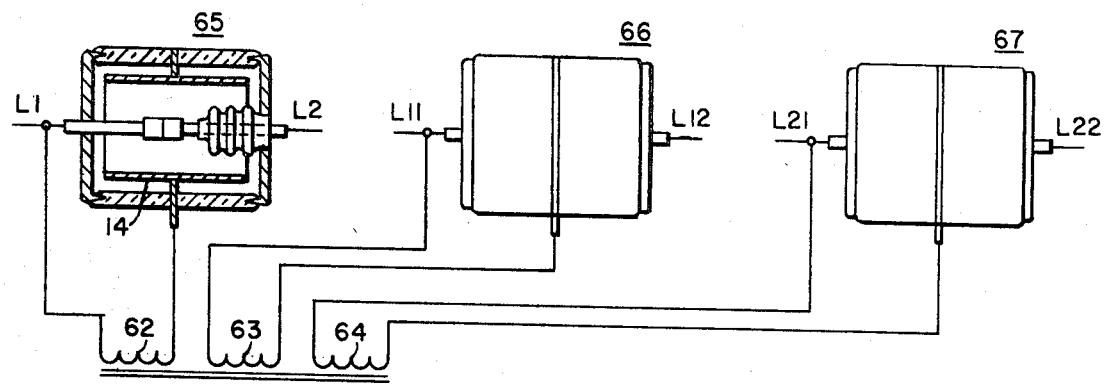
FIG. 5 is a diagrammatic view of a different type of pressure-measuring scheme for a three-phase tap-changer involving a single step-up transformer with three high-voltage secondary windings to provide the necessary high voltage for the three vacuum interrupters; and, FIG. 6 is a calibration curve, or plot illustrating the breakdown voltage against pressure for a typical commercial-type vacuum circuit interrupter of the type G.E. PV-01.

Referring to the drawings, and more particularly to FIG. 1 thereof, there is illustrated a three-phase vacuum-type circuit interrupter, generally designated by the reference numeral 1, and comprising three individual vacuum interrupters 2, 3 and 4. As is illustrated in FIG. 1, each vacuum interrupter comprises a vacuum-tight envelope 5 comprising an insulating casing of insulating material, and a pair of metallic end caps 6, 7 closing off the ends of the casing 5. Suitable seals are provided between the end caps 6, 7 and the casing 5 to render the envelope vacuum-tight. Located within the envelope 5 is a pair of separable electrodes, or rod contacts 9, 10, shown in the open-circuit position. These electrodes 9, 10 are formed of a suitable conductive material, such as copper or molybdenum. The electrode 9 is a stationary electrode suitably united to the upper end cap 6, whereas the electrode 10 is a movable electrode suitably mounted for vertical movement, and projecting through an opening 7a in the lower end cap 7. A flexible metallic bellows 11, interposed between the end-cap 7 and the movable electrode 10 provides a seal about the movable electrode, and allows for opening and closing movement thereof without impairing the vacuum inside the interrupter. The bellows 11 also provides a conductive connection between the movable electrode 10 and the end cap 7.

A suitable actuating device (not shown) is coupled to the end of the movable electrode 10 for driving it into contact with the other electrode 9 in order to close the interrupter, and also for returning the movable electrode 10 to its open position, in order to open the connected circuit.

When the movable electrode 10 is driven toward its open position from its closed position to open the interrupter, a circuit interrupting, or arcing gap 13 is established between the adjacent ends of the electrodes 9, 10, and the resulting arc, though quickly extinguished, vaporizes some of the metal of the electrodes 9, 10. In order to prevent this metallic vapor from condensing on the internal insulating walls 5a of the casing 5, there is provided a metallic shield 14, which is of generally tubular configuration, and extends along the length of the insulating casing 5 for substantial distances on opposite sides of the gap 13 between the electrodes 9, 10. In FIG. 1, all of the external electrical connections, provided between the various elements of the interrupter, are for the purpose of measuring the degree of vacuum inside the envelope 5, as will soon be described in more detail hereinafter. It is to be observed that when the interrupter is in service, these connections are not eliminated, and that under such conditions the pressure may be continuously monitored while the breaker is in operation.

As will be obvious, the condensing shield 14 is electrically isolated from both of the separable electrodes 9, 10. In more detail, this electrical isolation is provided in the disclosed interrupter by relying upon the insulating casing 5 as a supporting structure for the shield 14. In this regard, the insulating casing 5 is formed from two coaxially disposed glass, or ceramic tubes 5b, 5c joined together by a ceramic-to-metal, or glass-to-metal seal, which comprises suitable metallic discs 16 sealingly interposed between the adjacent ends of the tubes 5b, 5c. At its inner periphery disc 16 is suitably united, as by welding, to the tubular condensing shield 14, and thus supports the shield 14 upon the insulating casing 5. The outer periphery of the disc 16 preferably extends radially outwardly slightly beyond the outer periphery of the casing 5, as shown at 16a.

When an arc is established between the two main separable electrodes 9 and 10, the metallic vapor particles, liberated from the arcing tips by arcing, travel outwardly from the arcing gap 13. The condensing shield 14, which surrounds the arcing gap 13, provides metallic surfaces, which act to intercept and condense these vapor particles before they can reach the casing 5a. Thus, the floating condensing shield 14 acts to prevent the buildup of undesirable metallic coatings upon the internal insulating wall 5a of the casing 5.

The circuit-interrupting ability of the vacuum interrupter 1 depends to an important extent upon whether the pressure within the envelope 5 is below about $10^{14}$ mm. of mercury. For providing a reliable continuous indication of whether the pressure is below this level, there is provided an AC voltage "V" of commercial power frequency across one of the electrodes 9 and the floating condensing shield 14. The breakdown current is indicated either by visual means, as a lamp, an audible means by a bell, or actuates a relay for remote indication. The necessary voltage "V" can be supplied by the three-phase line-to-line, or line-to-neutral source voltage side of the interrupter 1. If the circuit does not supply the correct value of voltage, a step-up, or stepdown transformer can be employed.

In FIG. 1 there is illustrated a circuit 18 for an indicating system 19 using neon bulbs 21 ro indicate the breakdown current. Here a three-phase voltage source is illustrated; however, the circuit could be modified. In FIG. 1, the voltage source uses the line-to-line voltage "V," and the neon lamp 21 is at high potential above ground. Fiber optics, or light pipes 23 are inserted between the neon lamp 21 and the external grounded metal enclosure 25 for the circuit breaker 1. This provides the necessary electrical isolation and allows the visible light from the neon lamp 21 to be seen by an observer, such as operating personnel, externally of the equipment enclosure 25. Reference may be had to Skooglund et al. U.S. Pat. No. 3,335,367, issued Aug. 8, 1967 for a description of fiber-glass optics and their method of operation. A resistor 27 limits the breakdown current and another resistor 29 across the neon lamp 21 produces the initiating voltage for the neon lamp 21.

FIG. 2 utilizes a line-to-neutral voltage source system "E" of commercial power frequency to supply the voltage, and the neon lamps 21 can be mounted on the interrupter enclosure cases 25 provided the neutral is at the same potential as the case 25. Therefore, in this instance, light pipes 23 may be omitted.

In some situations, it may not be desirable to have a floating shield 14 as one of the electrodes for the breakdown test. In this instance, another electrode 31, as illustrated in FIG. 3, may be placed inside on the interrupter 1a at the time of fabrication of the evacuated housing 5'. Now the test voltage is applied across one electrode 10 and the additional inserted electrode 31. The additional electrode 31 may be a sphere, a point or a plate. Depending upon the voltage desired for breakdown at pressures greater than $10^{14}$ torr, the spacing "D" between the electrodes 7, 31 is preset. In any case, the gap distance "D" is selected so that the breakdown voltage is greater at pressures about $10^{13}$ torr than at atmospheric pressure. Therefore, the circuit will indicate when the pressure "P" is between a value of greater than $10^{14}$ torr up to at least an atmosphere.

The lead 31a to the additional electrode can be brought out through the glass wall 5' of the interrupter 1a. This will provide the required electrical insulation.

Figure 4:
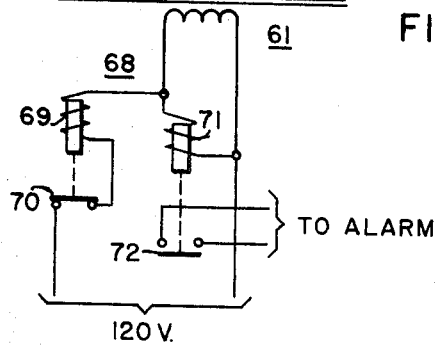
FIG. 4 is a diagrammatic view of a varient type of measuring circuit involving a step-up transformer to impose a relatively high voltage between the condensing shield and one of the electrodes, whereas the neon lamp is disposed in the low voltage side of the step-up transformer.
Figure 4:
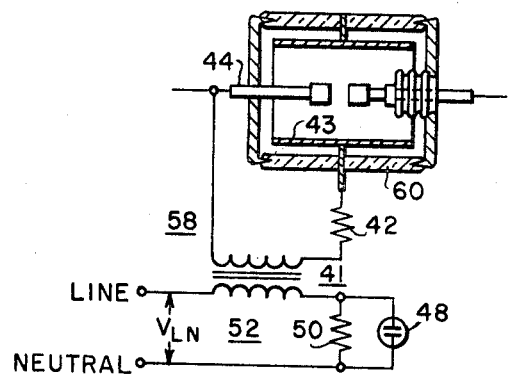

FIG. 4 illustrates a modification of the invention involving a step-up transformer 41 supplying a relatively high voltage of commercial power frequency through a resistance 42 between the condensing shield 43 and one of the electrodes 44 of the vacuum interrupter 45. A neon lamp 48 is disposed in parallel relationship to a resistance 50, which is interposed in the low voltage circuit 52 of the neutral-to-line generator voltage. The operation of the modified measuring arrangement 58 is generally the same as that described heretofore, namely, the passage of excess current between the condensing shield 43 and the electrode 44 permitting sufficient voltage drop across the resistance, so as to light the neon lamp, thereby indicating a relatively low-pressure condition within the evacuated envelope 60.

FIG. 5 illustrates a step-up transformer 61 having three high-voltage secondary windings 62, 63 and 64 for impressing the high-voltage of commercial power frequency between the contacts and condensing shields 14 of three vacuum interrupters 65, 66 and 67. These vacuum interrupters may be used in a tap-changing circuit, not shown, or they may be used to control any three circuits.

Figure 6:
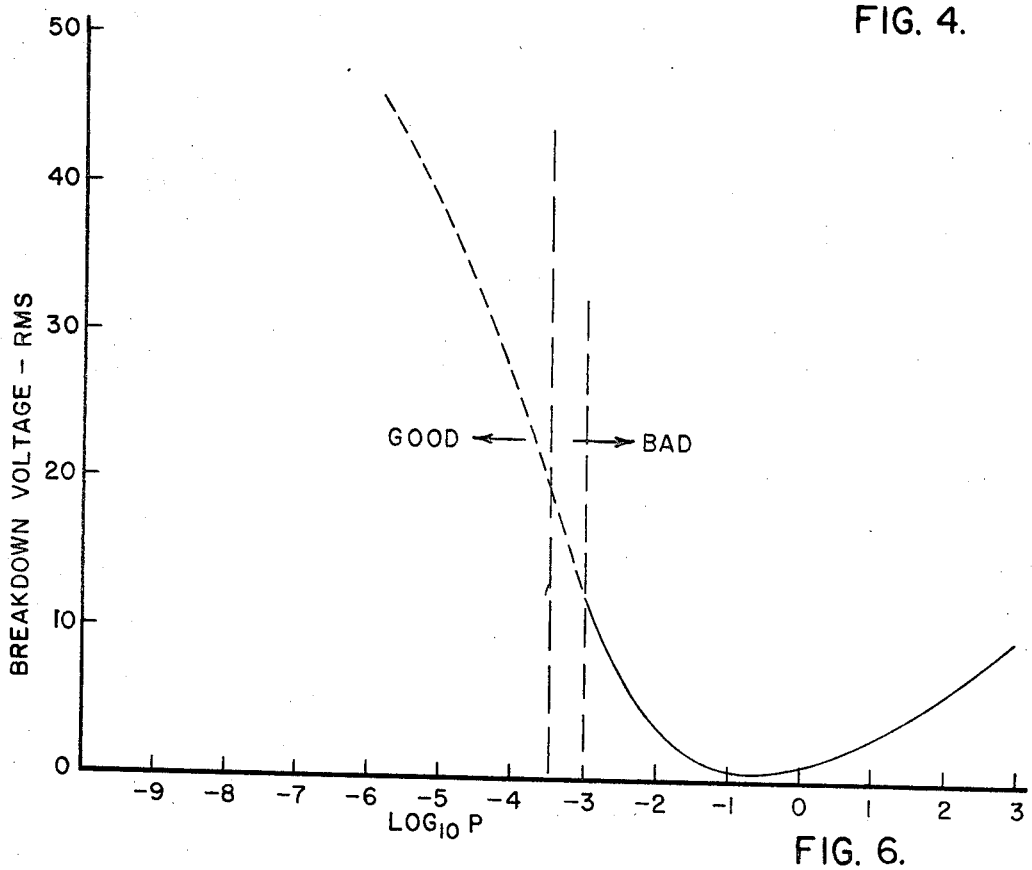

To determine the state of vacuum in all three interrupters 65, 66 and 67 the high-voltage is impressed, as discussed in FIG. 1 above. If appreciable current flows, the particular secondary winding is short-circuited and this is sensed in the primary circuit 68 by a current sensing relay 69. This relay 69 will open its contacts 70, and deenergize the alarm relay 71. Back contacts 72 of the alarm relay 71 will activate an alarm circuit. Constant monitoring of the state of pressure in all three vacuum interrupters is thus possible. FIG. 6 gives a plot of breakdown voltage of shield 14 to the electrode 9 versus pressure "P" within a vacuum interrupter 1. There was completed in the laboratory measurements of breakdown voltage between the shield 14 and electrodes 9, 10 against pressure "P" of a G.E. PV-01 vacuum interrupter. From the data collected, there is sufficient evidence that the pressure measurement method, described in FIGS. 1—3 of the present disclosure, is feasible. A curve of the breakdown voltage (60 Hz. versus pressure for the aforesaid commercial-type vacuum interrupter is illustrated in FIG. 6. The electrodes 9, 10 of the interrupter in the tests were held in the closed position, and a 60 Hz. voltage was applied between the shield 14 and electrodes 9, 10. This voltage was increased at a rate of 1.4 kv./sec. until breakdown occurred. Each point represents the mean value of twenty trials. The points for pressures "P" greater than $10^{13}$ torr were taken on the aforesaid G.E. PV-01 vacuum interrupter with a thermocouple pressure gauge attached. The low-pressure point was obtained from voltage breakdown measurements made on a PV-01 interrupter that had not been exposed to air. Therefore, the surfaces had not been contaminated by air, which will influence the value of voltage breakdown at low pressure.

It should be noted that if the breakdown voltage is less than 20 kv., the interrupter 1 is considered bad, while if the breakdown voltage is greater than 20 kv., the interrupter 1 is considered good. It is to be noted that the pressure "P" is plotted as $\log_{10} P$, where "P" is expressed in torr.

From the foregoing description it will be apparent that there has been provided a pressure-measuring arrangement 19, which will continuously indicate the integrity of a vacuum-type circuit interrupter 1, and does not employ elements which are inserted into the vacuum envelope 5. The additional circuitry may be energized from the source leads themselves, as indicated in FIGS. 1 and 2, or step-up or stepdown transformers may be used in substitution.

The advantage of using a step-up or stepdown transformer is that the neon lamp, alarm, or relay can be inserted in the low voltage side of the transformer. This would allow the current indicating devices to be located at low potential.

I claim:
1. A pressure indicator for a vacuum-type circuit interrupter for determining the interrupting capability of said interrupter comprising, in combination:
   a. means defining an evacuated envelope,
   b. a pair of separable arcing contacts disposed within said evacuated envelope,
   c. a conducting element within said envelope insulatingly supported relative to said separable arcing contacts,
   d. alternating current circuit means imposing a relatively high alternating voltage of commercial power frequency between said conducting element and one of said separable arcing contacts for inducing alternating current flow therebetween in said circuit means under poor vacuum conditions, and,
   e. sensing means responsive to the magnitude of current flow in said alternating current circuit means for pressure indication within the evacuated envelope.

2. The pressure indicator of claim 1, wherein the conducting element is a condensing shield.

3. The pressure indicator of claim 1, wherein the conducting element is an additional stationary electrode spaced a predetermined distance from the arcing contacts.

4. The pressure indicator of claim 1, wherein a source voltage is controlled by the circuit interrupter and the relatively high alternating voltage is obtained from said source voltage controlled by the circuit interrupter.

5. The pressure indicator of claim 1, wherein a resistance is connected serially into said circuit means, and a neon bulb is electrically connected in parallel across said resistance, whereby the neon bulb constitutes a visual sensing means and lights upon excessive current flow through the resistance indicating thereby a low-pressure condition within the evacuated envelope.

6. The combination of claim 5, wherein a glass fiber rod conducts light from the illuminated condition of the neon bulb to the grounded housing of the interrupter.

7. The combination of claim 4, wherein the source voltage has a grounded neutral, and a high-voltage measuring circuit is connected between said grounded neutral and said conductive element, a resistance serially connected in said high-voltage measuring circuit with one terminal thereof at ground potential, and a neon bulb is electrically connected in parallel across said resistance, whereby the neon bulb constitutes a visual sensing means and lights upon excessive current flow through the resistance indicating thereby a low-pressure condition within the evacuated envelope.

8. The combination of claim 2, wherein the alternating-current circuit means comprises a step-up transformer having a low voltage primary winding and a high-voltage secondary winding, a resistance is serially connected in said low voltage primary winding, and a neon bulb is electrically connected in parallel across said resistance, whereby the neon bulb constitutes a visual sensing means and lights upon excessive current flow through the resistance indicating thereby a low-pressure condition within the evacuated envelope.